(12) United States Patent
Yamamoto et al.

(10) Patent No.: US 8,360,186 B2
(45) Date of Patent: Jan. 29, 2013

(54) IN-WHEEL MOTOR DRIVE DEVICE (75) Inventors: Ken Yamamoto, Iwata (JP); Tomoaki Makino, Iwata (JP); Minoru Suzuki, Iwata (JP); Takayuki Iio, Hamamatsu (JP)

(73) Assignees: NTN Corporation, Osaka (JP); Suzuki Motor Corporation, Shizuoka (JP)

( * ) Notice: Subject to any disclaimer, the term of this patent is extended or adjusted under 35 U.S.C. 154(b) by 321 days.

(21) Appl. No.: 12/920,343

(22) PCT Filed: Mar. 6, 2009

(86) PCT No.: PCT/JP2009/054282
§ 371 (c)(1),
(2), (4) Date: Aug. 31, 2010

(87) PCT Pub. No.: WO2009/113456
PCT Pub. Date: Sep. 17, 2009

(65) Prior Publication Data
US 2011/0011203 A1 Jan. 20, 2011

(30) Foreign Application Priority Data
Mar. 11, 2008 (JP) .................................. 2008-061215

(51) Int. Cl.
*B60K 1/00* (2006.01)
(52) U.S. Cl. .................................... 180/65.51; 74/606 A
(58) Field of Classification Search ............... 180/65.51; 74/606
See application file for complete search history.

(56) References Cited

U.S. PATENT DOCUMENTS

| 7,527,113 | B2 * | 5/2009 | Jenkins ...................... 180/65.51 |
| 7,530,416 | B2 * | 5/2009 | Suzuki ....................... 180/65.51 |
| 7,622,836 | B2 * | 11/2009 | DeVeny et al. ............. 310/75 C |
| 7,819,214 | B2 * | 10/2010 | Mizutani et al. ........... 180/65.51 |
| 7,828,095 | B2 * | 11/2010 | Murata et al. .............. 180/65.51 |
| 7,950,483 | B2 * | 5/2011 | Murata ....................... 180/65.51 |
| 7,950,484 | B2 * | 5/2011 | Moriguchi et al. ........ 180/65.51 |
| 2005/0045393 | A1 * | 3/2005 | Mizutani et al. ............ 180/65.5 |
| 2005/0061565 | A1 * | 3/2005 | Mizutani et al. ............ 180/65.5 |
| 2007/0246277 | A1 * | 10/2007 | Mizutani et al. ............ 180/65.5 |
| 2008/0035399 | A1 * | 2/2008 | Murata et al. ................ 180/65.5 |

(Continued)

FOREIGN PATENT DOCUMENTS

JP 2001-65647 A 3/2001
JP 2005-8143 A 1/2005
(Continued)

*Primary Examiner* — Jeffrey J Restifo
*Assistant Examiner* — Erez Gurari
(74) *Attorney, Agent, or Firm* — Clark & Brody (57) ABSTRACT

An in-wheel motor drive device (21) includes a motor part A, a reducer part B, a wheel hub C, and a reducer part lubricating mechanism to supply a lubricant oil to the reducer part. The reducer part lubricating mechanism includes a lubricant oil path (25c), a lubricant oil supply port (25d), a lubricant oil discharge port (22b), a circulation oil path (45) passing through a casing (22) to connect the lubricant oil discharge port (22b) to the lubricant oil path (25c), and to return the lubricant oil discharged from the lubricant oil discharge port (22b) to the lubricant oil path (25c), a cooling water path (22e) provided in the casing (22) so as to be in contact with the circulation oil path (45) to cool down the lubricant oil passing through the circulation oil path (45), and a partition member (49) arranged in a contact position between the circulation oil path (45) and the cooling water path (22e), to separate them.

6 Claims, 9 Drawing Sheets

U.S. PATENT DOCUMENTS

| | | | |
|---|---|---|---|
| 2008/0308330 A1* | 12/2008 | Murata | 180/65.5 |
| 2009/0025991 A1* | 1/2009 | Moriguchi et al. | 180/65.5 |
| 2011/0011203 A1* | 1/2011 | Yamamoto et al. | 74/606 A |

FOREIGN PATENT DOCUMENTS

| | | |
|---|---|---|
| JP | 2005-67416 A | 3/2005 |
| JP | 2005-253167 A | 9/2005 |
| JP | 2006-258289 A | 9/2006 |
| JP | 2007-57015 A | 3/2007 |
| JP | 2007-120510 A | 5/2007 |
| JP | 2007-191035 A | 8/2007 |
| JP | 2008-48493 A | 2/2008 |

* cited by examiner

IN-WHEEL MOTOR DRIVE DEVICE

TECHNICAL FIELD

The present invention relates to an in-wheel motor drive device in which an output shaft of an electric motor and a wheel hub are connected through a reducer.

BACKGROUND ART

Figure 10:
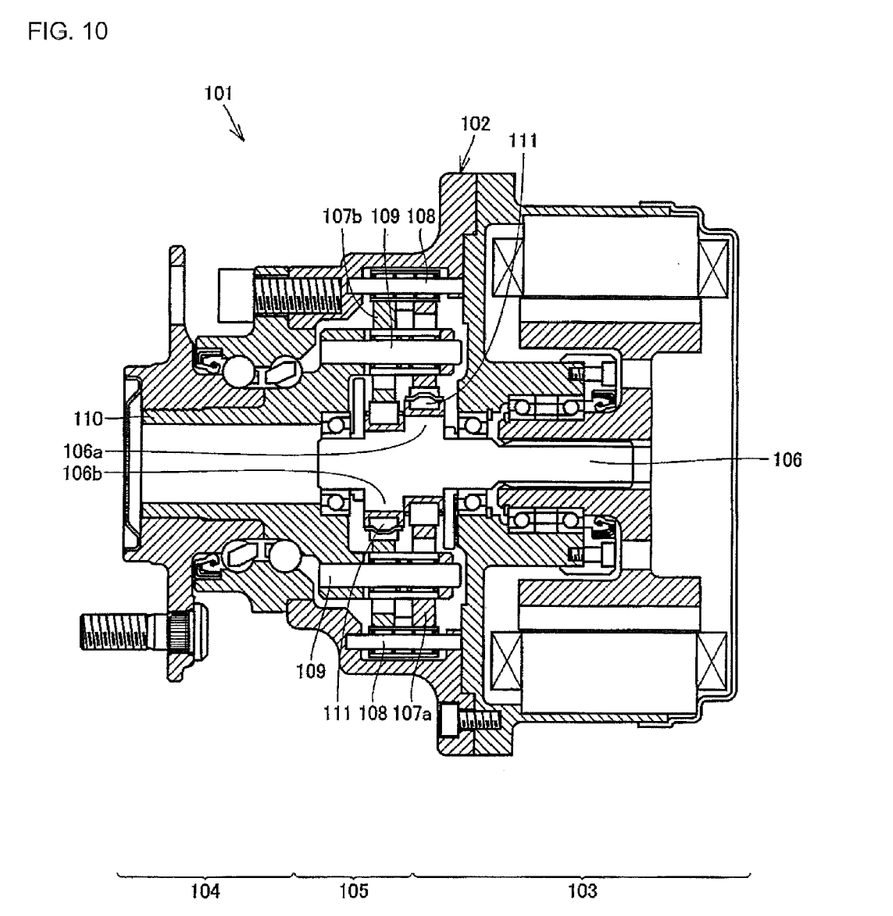
FIG. 10 is a view showing a conventional in-wheel motor drive device.

A conventional in-wheel motor drive device 101 is disclosed in Japanese Unexamined Patent Publication Laid-Open No. 2006-258289, for example. Referring to FIG. 10, the in-wheel motor drive device 101 includes a motor part 103 to generate driving force in a casing 102 mounted on a car body, a wheel hub bearing part 104 connected to a wheel, and a reducer part 105 to reduce rotation speed of the motor part 103 and transmit it to the wheel hub bearing part 104.

In the above in-wheel motor drive device 101, a low torque and high rotation motor is employed for the motor part 103 with a view to reducing the device in size. Meanwhile, the wheel hub bearing part 104 requires a high torque to drive the wheel. Thus, a cycloidal reducer which is compact in size and capable of obtaining a high reduction ratio is employed for the reducer part 105 in some cases.

In addition, the conventional reducer part 105 using the cycloidal reducer includes a motor side rotation member 106 having eccentric parts 106a and 106b, curved plates 107a and 107b arranged in the eccentric parts 106a and 106b, a rolling bearing 111 to rotatably support each of the curved plates 107a and 107b with respect to the motor side rotation member 106, a plurality of outer pins 108 to allow the curved plates 107a and 107b to generate rotation motion by engaging with periphery surfaces of the curved plates 107a and 107b, and a plurality of inner pins 109 to transmit the rotation motion of the curved plates 107a and 107b to a wheel side rotation member 110.

In the above in-wheel motor drive device 101, a lubricant oil is sealed in the reducer part 105, and supplied to contact parts between the curved plates 107a and 107b, and the outer pin 108 and the inner pin 109, and a track surface of the rolling bearing 111.

At this time, the lubricant oil becomes hot due to frictional loss of the reducer part 105, and an iron loss and agitation resistance of the motor part 103, so that its lubrication performance is lowered. As a result, durability of the in-wheel motor drive device 101 could be lowered.

DISCLOSURE OF THE INVENTION

Thus, it is an object of the present invention to provide an in-wheel motor drive device superior in durability and high in reliability by keeping a temperature of a lubricant oil in an appropriate condition.

An in-wheel motor drive device according to the present invention includes a motor part to rotatably drive a motor side rotation member, a reducer part to reduce rotation speed of the motor side rotation member and transmit it to a wheel side rotation member, a casing to hold the motor part and the reducer part, a wheel hub fixedly connected to the wheel side rotation member, and a reducer part lubricating mechanism to supply a lubricant oil to the reducer part. The reducer part lubricating mechanism includes a lubricant oil path provided in the motor side rotation member, a lubricant oil supply port extending from the lubricant oil path toward an outer diameter surface of the motor side rotation member, a lubricant oil discharge port provided in the casing to discharge the lubricant oil from the reducer part, a circulation oil path passing through the casing to connect the lubricant oil discharge port to the lubricant oil path, and to return the lubricant oil discharged from the lubricant oil discharge port to the lubricant oil path, a cooling water path provided in the casing so as be in contact with the circulation oil path to cool down the lubricant oil passing through the circulation oil path, and a partition member arranged in a contact position between the circulation oil path and the cooling water path, to separate them.

As described above, the temperature of the reducer part can be prevented from rising by cooling the lubricant oil passing through the circulation oil path and then returning it to the reducer part. As a result, the in-wheel motor drive device can be superior in durability and high in reliability.

Preferably, the partition member is formed of a material having thermal conductivity higher than that of the casing. Thus, cooling efficiency of the lubricant oil is improved. In addition, as a specific material, the material includes nonferrous metal such as brass, copper or aluminum.

Preferably, the circulation oil path axially reciprocates in the casing. Thus, the lubricant oil can be returned to the lubricant oil path after sufficiently cooled down.

Preferably, the reducer part lubricating mechanism further comprises a rotation pump arranged in the casing to circulate the lubricant oil by use of a rotation of the wheel side rotation member. The lubricant oil can be further stably supplied to a whole area of the reducer part by forcibly circulating the lubricant oil by the rotation pump.

As one embodiment, the rotation pump is a cycloidal pump including an inner rotor having teeth composed of a cycloidal curve along its outer diameter surface and integrally rotating with the wheel side rotation member, and an outer rotor having teeth composed of a cycloidal curve along its inner diameter surface, rotatably supported by the casing, and rotating around a point away from a rotation center of the inner rotor.

Preferably, the motor side rotation member has an eccentric part. The reducer part includes a revolution member having a through hole passing through the eccentric part, and executing revolution motion around a rotation axis of the motor side rotation member in accordance with a rotation thereof, a periphery engagement member fixed to the casing, and engaging with a periphery part of the revolution member to generate rotation motion of the revolution member, and a motion converting mechanism having an inner pin provided in the wheel side rotation member and a hole having a diameter larger than an outer diameter of the inner pin by a predetermined amount to receive the inner pin, to convert the rotation motion of the revolution member to rotation motion around a rotation axis of the motor side rotation member and transmit it to the wheel side rotation member.

By employing the above cycloidal reducer, a compact size and a high reduction ratio can be implemented.

According to the present invention, the temperature of the reducer part can be prevented from rising by returning the cooled lubricant oil to the lubricant oil path. As a result, the in-wheel motor drive device can be superior in durability and high in reliability.

BEST MODE FOR CARRYING OUT THE INVENTION

A description will be made of an in-wheel motor drive device 21 according to one embodiment of the present invention with reference to FIGS. 1 to 9.

Figure 8:
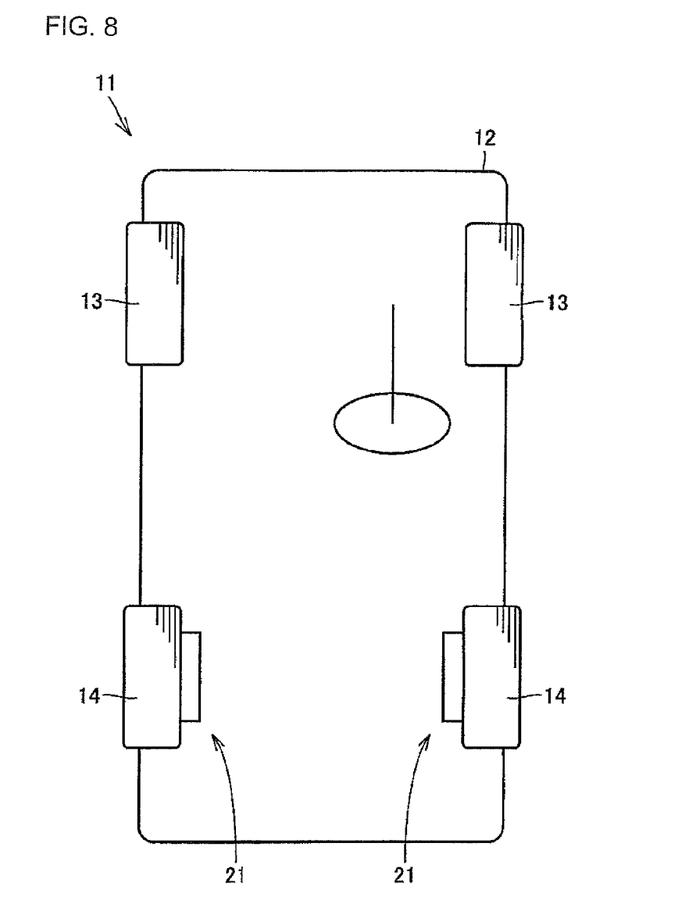
FIG. 8 is a plan view of an electric car having the in-wheel motor drive device in FIG. 1.
Figure 9:
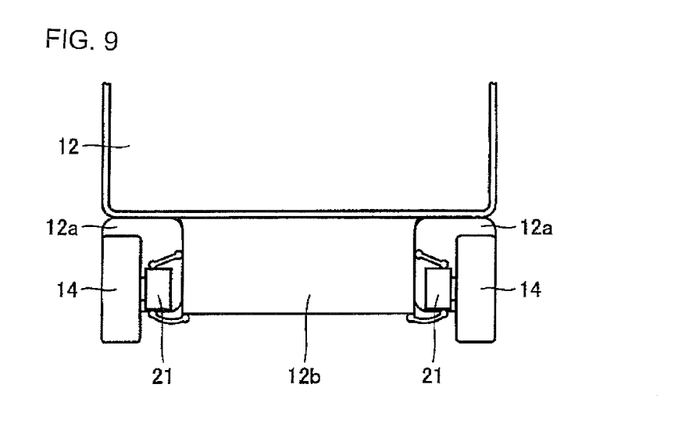
FIG. 9 is a rear cross-sectional view of the electric car in FIG. 8.

FIG. 8 is a schematic view of an electric car 11 employing the in-wheel motor drive device 21 according to one embodiment of the present invention, and FIG. 9 is a schematic view of the electric car 11 taken from its rear side. Referring to FIG. 8, the electric car 11 includes a chassis 12, front wheels 13 as steerable wheels, rear wheels 14 as driving wheels, and the in-wheel motor drive device 21 to transmit driving force to respective right and left rear wheels 14. Referring to FIG. 9, the rear wheel is housed in a wheel housing 12a of the chassis 12, and fixed to a lower part of the chassis 12 through a suspension 12b.

The suspension 12b supports the rear wheels 14 by suspension arms extending from side to side, and absorbs the oscillation that the rear wheel 14 receives from the ground, by a strut including a coil spring and a shock absorber to prevent the chassis 12 from oscillating. Furthermore, a stabilizer to prevent a car body from inclining at the time of turning is provided at a connection part of the right and left suspension arms. In addition, it is preferable that the suspension device 12b employs an independent suspension system capable of moving up and down the right and left wheels independently, in order to improve a property to follow road surface roughness, and to efficiently transmit the driving force of the driving wheel to a road surface.

Since the in-wheel motor drive device 21 to drive the right and left rear wheels independently is provided in the wheel housing 12b, it is not necessary to provide a mechanism such as a motor, a drive shaft, and a differential gear on the chassis 12, so that the electric car 11 has advantages of being able to ensure a large passenger space, and control the rotations of the right and left driving wheels independently.

Meanwhile, it is necessary to reduce an unsprung weight in order to improve a running stability of the electric car 11. In addition, in order to ensure a further large passenger space, the in-wheel motor drive device 21 is required to be miniaturized. Thus, the in-wheel motor drive device 21 according to one embodiment of the present invention as shown in FIG. 1 is employed.

Figure 2:
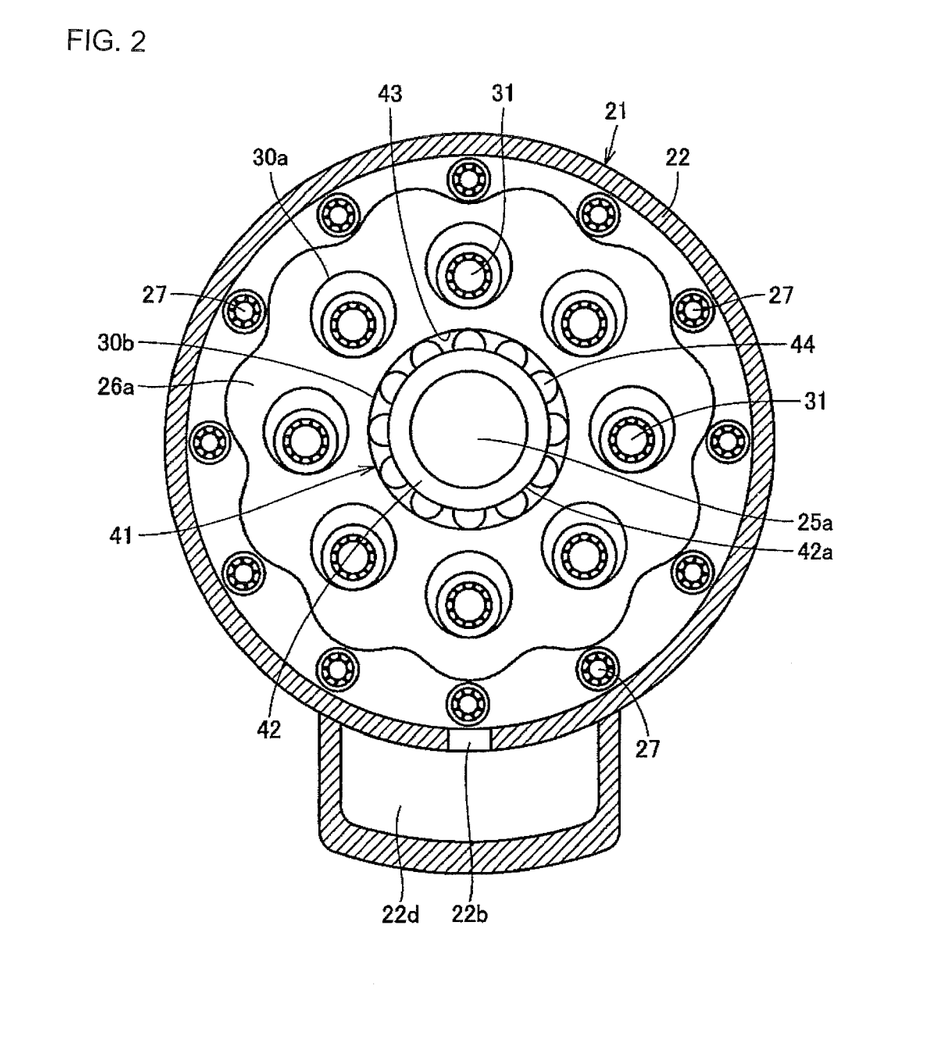
FIG. 2 is a cross-sectional view taken along a line II-II in FIG. 1.
Figure 3:
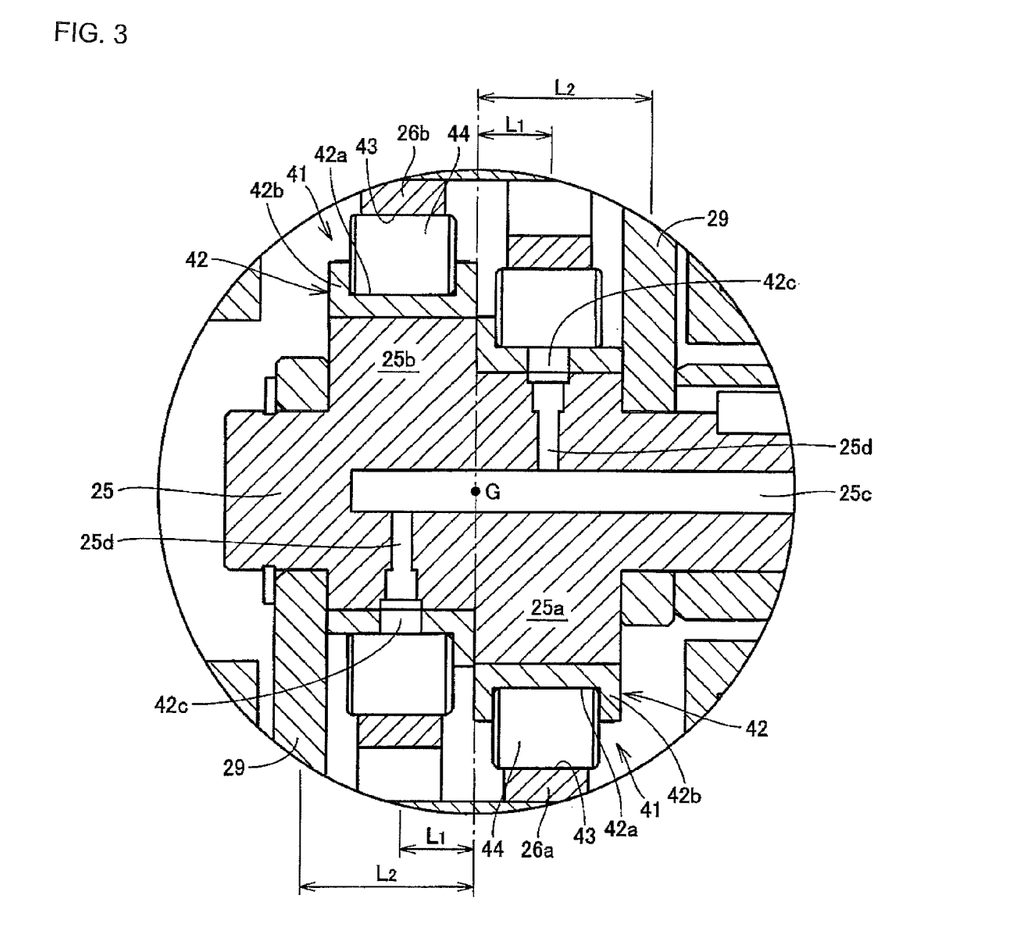
FIG. 3 is an enlarged view of a periphery of an eccentric part in FIG. 1.
Figure 4:
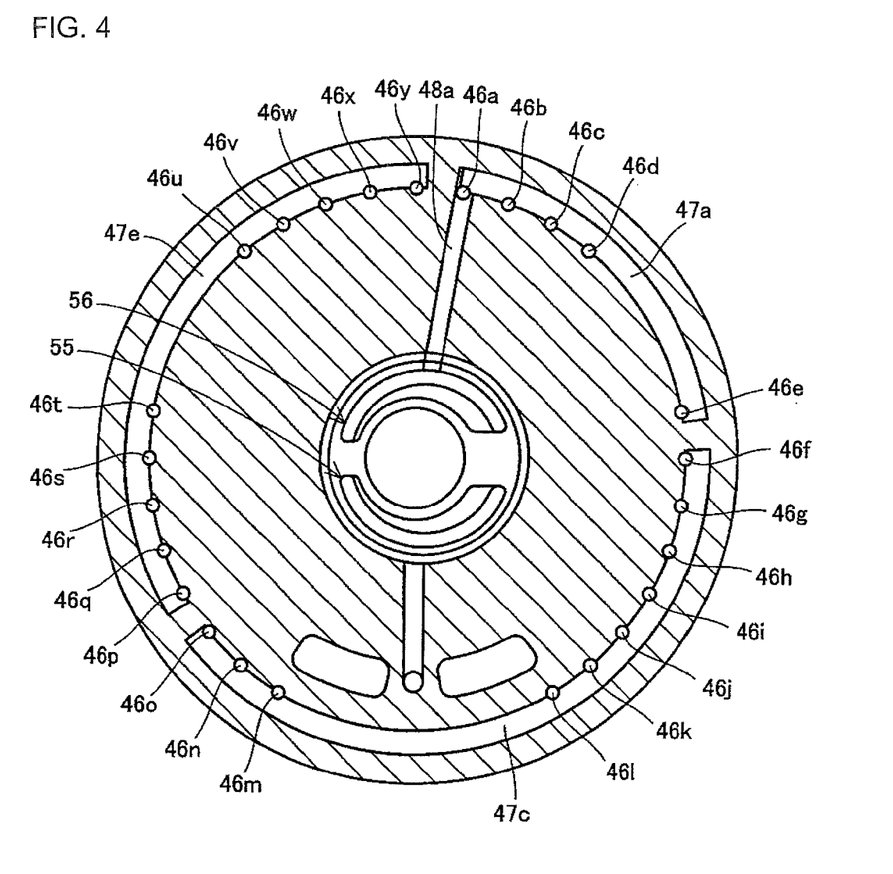
FIG. 4 is a cross-sectional view taken along a line IV-IV in FIG. 1.
Figure 5:
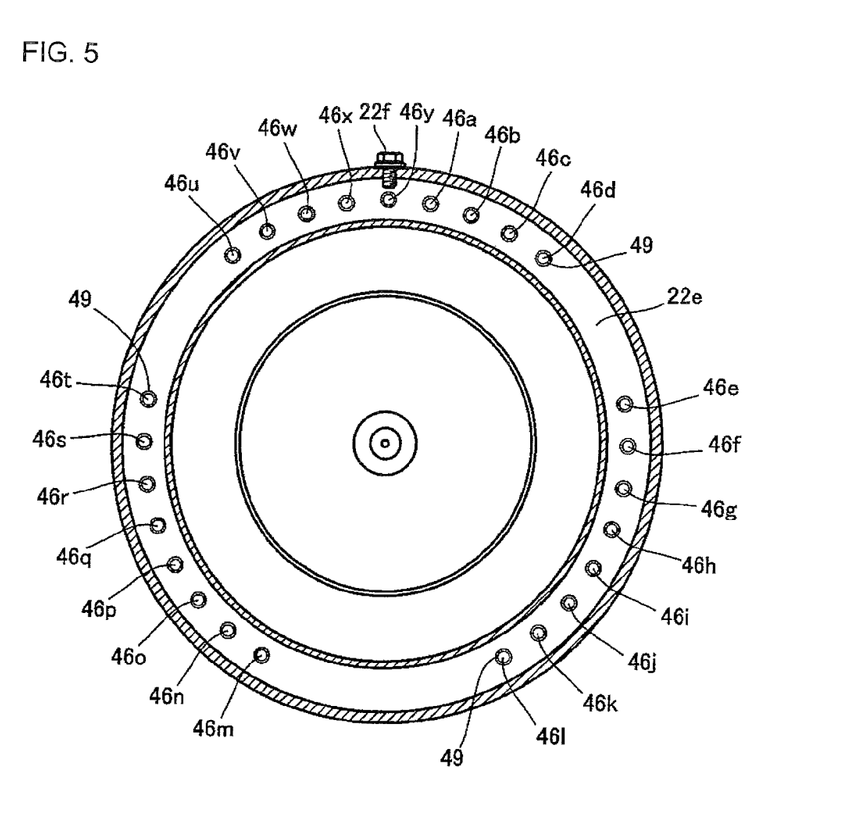
FIG. 5 is a cross-sectional view taken along a line V-V in FIG. 1.
Figure 6:
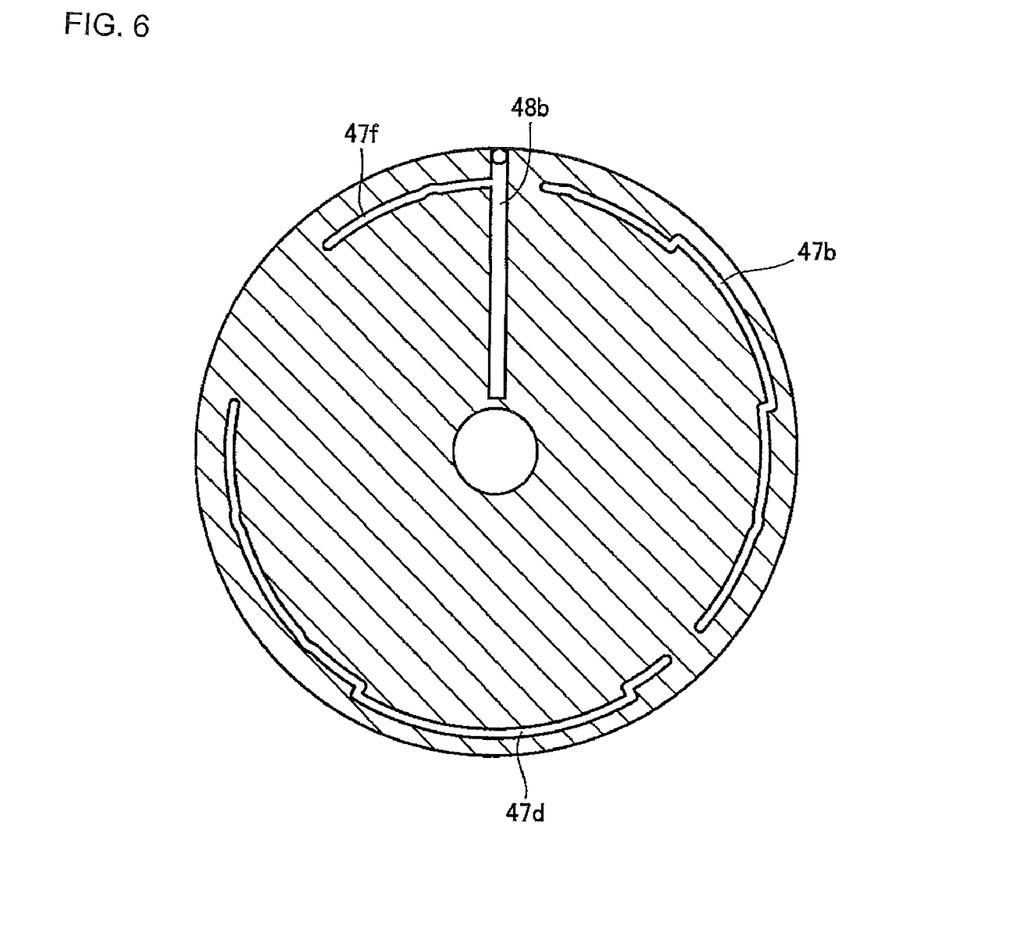
FIG. 6 is a cross-sectional view taken along a line VI-VI in FIG. 1.
Figure 7:
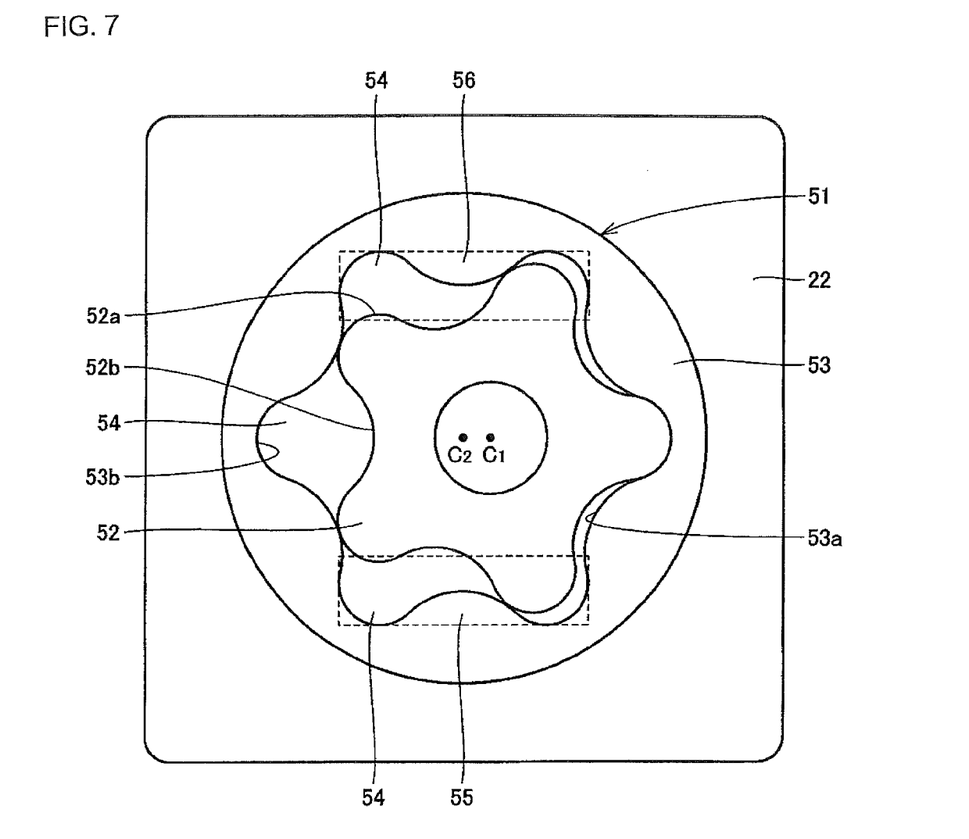
FIG. 7 is a cross-sectional view of a rotation pump in FIG. 1.

A description will be made of the in-wheel motor drive device 21 according to one embodiment of the present invention with reference to FIGS. 1 to 7. FIG. 1 is a schematic cross-sectional view of the in-wheel motor drive device 21, FIG. 2 is a cross-sectional view taken along a line II-II in FIG. 1, FIG. 3 is an enlarged view of a periphery of eccentric parts 25a and 25b, FIG. 4 is a cross-sectional view taken along a line IV-IV in FIG. 1, FIG. 5 is a cross-sectional view taken along a line V-V in FIG. 1, FIG. 6 is a cross-sectional view taken along a line VI-VI in FIG. 1, and FIG. 7 is a cross-sectional view of a rotation pump 51.

Figure 1:
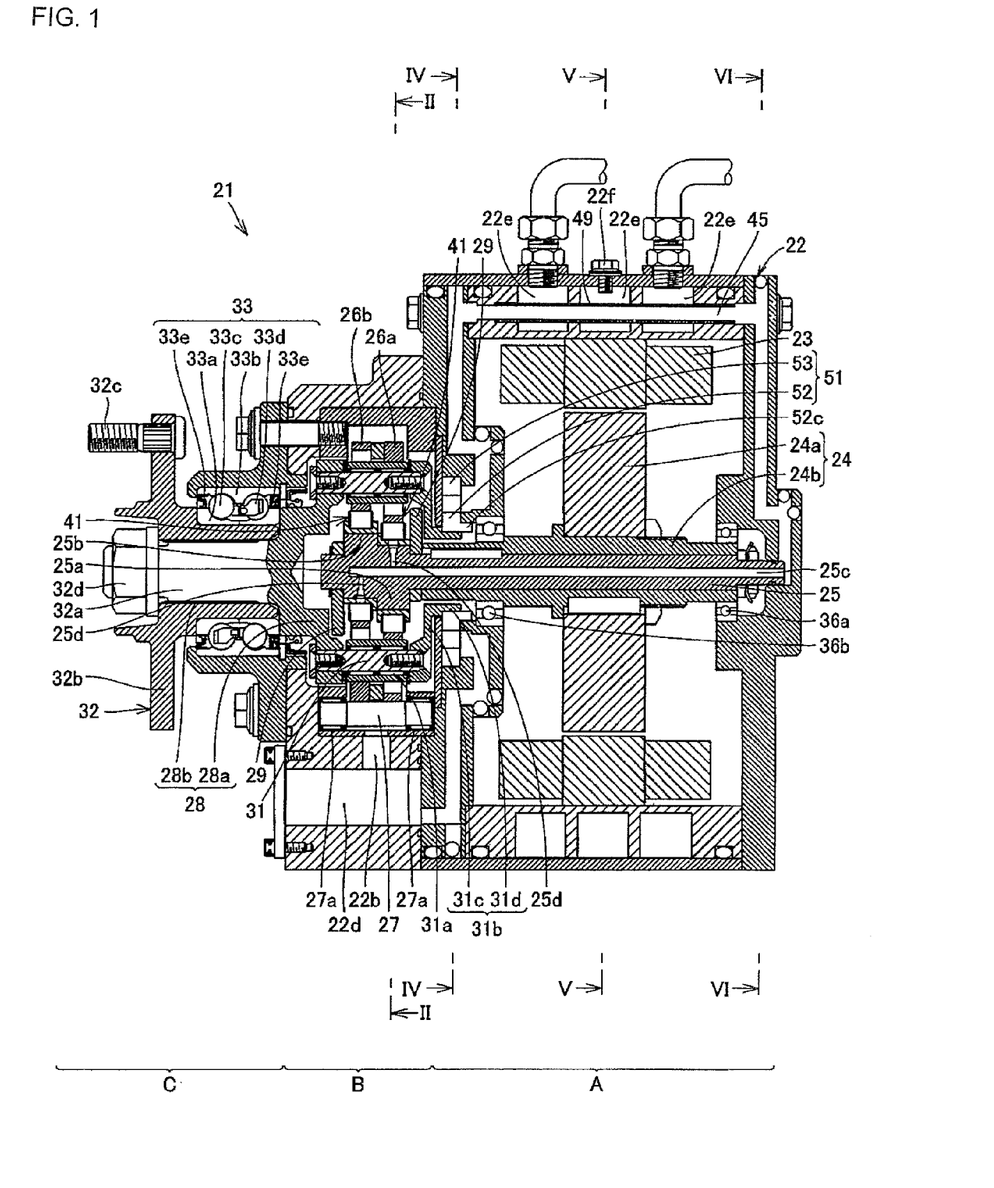
FIG. 1 is a view showing an in-wheel motor drive device according to one embodiment of the present invention.

First, referring to FIG. 1, the in-wheel motor drive device 21 serving as one example of a vehicle reducer part includes a motor part A to generate driving force, a reducer part B to reduce rotation speed of the motor part A and output it, and a wheel hub bearing part C to transmit the output from the reducer part B to the driving wheel 14, and the motor part A and the reducer part B are housed in a casing 22, and mounted in the wheel housing 12a of the electric car 11 as shown in FIG. 9.

The motor part A is a radial gap motor including a stator 23 fixed to the casing 22, a rotor 24 arranged on the inner side of the stator 23 so as to be opposed thereto with a radial space in between, and a motor side rotation member 25 fixedly connected to the inner side of the rotor 24 and integrally rotating with the rotor 24. The rotor 24 has a flange-shaped rotor part 24a and a cylinder-shaped hollow part 24b and is rotatably supported by rolling bearings 36a and 36b with respect to the casing 22.

The motor side rotation member 25 is arranged so as to stride over the motor part A and the reducer part B to transmit the driving force of the motor part A to the reducer part B, and has the eccentric parts 25a and 25b in the reducer part B. This motor side rotation member 25 is fitted and fixed to the hollow part 24b of the rotor 24, and integrally rotates with the rotor 24. Furthermore, the two eccentric parts 25a and 25b are provided with their phases shifted by 180° in order to offset centrifugal force generated by eccentric motion with each other.

The reducer part B includes curved plates 26a and 26b serving as revolution members rotatably held by the eccentric parts 25a and 25b, a plurality of outer pins 27 held in fixed positions of the casing 22 and serving as periphery engagement members to engage with peripheral parts of the curved plates 26a and 26b, a motion converting mechanism to transmit rotation motion of the curved plates 26a and 26b to a wheel side rotation member 28, and a counterweight 29 positioned so as to be adjacent to the respective eccentric parts 25a and 25b. In addition, a reducer part lubricating mechanism to supply a lubricant oil to the reducer part B is provided in the reducer part B.

The wheel side rotation member 28 has a flange part 28a and a shaft part 28b. The flange part 28a has holes to fix inner pins 31 in its end face, at circumferentially regular intervals around a rotation axis of the wheel side rotation member 28. In addition, the shaft part 28b is fitted and fixed to the wheel hub 32, and transmits an output of the reducer part B to the wheel 14.

Referring to FIGS. 2 and 3, the curved plate 26a has a plurality of waveforms composed of a trochoidal curve such as epitrochoid around its periphery, and has a plurality of through holes 30a and 30b penetrating from one side end face to the other side end face. The through holes 30a are circumferentially provided at regular intervals around a rotation axis of the curved plate 26a, and receive the inner pins 31 which will be described below. In addition, the through hole 30b is provided in the center of the curved plate 26a, and fits to the eccentric part 25a.

The curved plate 26a is rotatably held by a rolling bearing 41 with respect to the eccentric part 25a. Referring to FIG. 3, the rolling bearing 41 is a cylindrical roller bearing which includes an inner ring member 42 fitting to an outer diameter surface of the eccentric part 25a, and having an inner side track surface 42a on the outer diameter surface, an outer side track surface 43 directly formed on an inner diameter surface of the through hole 30b of the curved plate 26a, a plurality of cylindrical rollers 44 arranged between the inner side track surface 42a and the outer side track surface 43, and a retainer (not shown) to retain an interval of the adjacent cylindrical rollers 44. In addition, the inner ring member 42 has a flange part 42b projecting from axial each end of the inner side track surface 42a toward radial outer side.

The outer pins 27 are circumferentially provided at regular intervals around a rotation axis of the motor side rotation member 25. As the curved plates 26a and 26b execute the revolution motion, the waveforms of the curved shape engage with the outer pins 27, to allow the curved plates 26a and 26b to execute rotation motion. Here, the outer pin 27 is rotatably supported by a needle roller bearing 27a with respect to the casing 22. Thus, contact resistance with the curved plates 26a and 26b can be reduced.

The counterweight 29 is in a shape of a disc, and has a through hole to fit to the motor side rotation member 25 in a position away from its center, and arranged at a position adjacent to the respective eccentric parts 25a and 25b with its phase sifted by 180° with respect to the eccentric part in order to offset unbalance inertia coupling generated due to the rotation of the respective curved plates 26a and 26b.

Here, referring to FIG. 3, when it is assumed that the center point between the two curved plates 26a and 26b is G, a relationship that $L_1 \times m_1 \times \epsilon_1 = L_2 \times m_2 \times \epsilon_2$ is satisfied wherein $L_1$ represents a distance between the center point G and a center of the curved plate 26a, $m_1$ represents a sum of the mass of the curved plate 26a, the rolling bearing 41, and the eccentric part 25a, $\epsilon_1$ represents an eccentric amount of the gravity center of the curved plate 26a from the rotation axis, $L_2$ represents a distance between the center point G and the counterweight 29, $m_2$ represents the mass of the counterweight 29, and $\epsilon_2$ represents an eccentric amount of the gravity center of the counterweight 29 from the rotation axis, on the right side of the center point G in FIG. 3. In addition, the same relationship is satisfied between the curved plate 26b and the counterweight 29 on the left side of the center point G in FIG. 3.

The motion converting mechanism is composed of the plurality of inner pins 31 held by the wheel side rotation member 28, and the through holes 30a provided in the curved plates 26a and 26b. The inner pins 31 are circumferentially provided at regular intervals around the rotation axis of the wheel side rotation member 28, and their one axial side ends are fixed to the wheel side rotation member 28. In addition, a needle roller bearing 31a is provided at a position which abuts on an inner wall surface of the through hole 30a of the respective curved plates 26a and 26b in order to reduce frictional resistance with the respective curved plates 26a and 26b.

In addition, a stabilizer 31b is provided at an axial end of the inner pin 31. The stabilizer 31b includes an annular part 31c, and a cylindrical part 31b axially extending from an inner diameter surface of the annular part 31c. The other axial side ends of the inner pins 31 are fastened to the annular part 31c by bolts. A load applied from the curved plates 26a and 26b to some inner pins 31 is supported by all of the inner pins 31 through the stabilizer 31b, so that stress acting on the inner pins 31 can be reduced and durability can be improved.

Meanwhile, the through hole 30a is provided so as to correspond to each of the inner pins 31, and an inner diameter dimension of the through hole 30a is set to be larger than an outer diameter dimension (a maximum outer diameter including the needle roller bearing 31a, which is the same in the following) of the inner pin 31 by a predetermined amount.

The reducer part lubricating mechanism is provided to supply the lubricant oil to the reducer part B, and includes a lubricant oil path 25c, a lubricant oil supply port 25d, a lubricant oil discharge port 22b, a lubricant oil storage part 22d, the rotation pump 51, and a circulation oil path 45.

The lubricant oil path 25c extends inside the motor side rotation member 25 along an axial direction. In addition, the lubricant oil supply port 25d extends from the lubricant oil path 25c toward an outer diameter surface of the motor side rotation member 25. In addition, in this embodiment, the lubricant oil supply port 25d is provided in the respective eccentric parts 25a and 25b.

In addition, the lubricant oil discharge port 22b to discharge the lubricant oil from the reducer part B is provided at least one section of the casing 22 in the reducer part B. In addition, the circulation oil path 45 which connects the lubricant oil discharge port 22b to the lubricant oil path 25c is provided in the casing 22. Thus, the lubricant oil discharged from the lubricant oil discharge port 22b is returned to the lubricant oil path 25c through the circulation oil path 45.

The circulation oil path 45 is composed of oil paths 46a to 46y (collectively referred to as the "axial oil path 46") which axially extend in the casing 22, oil paths 47a to 47f (collectively referred to as the "circumferential oil path 47") which are connected to the axial both ends of the axial oil path 46 and circumferentially extend, and oil paths 48a and 48b (collectively referred to as the "radial oil path 48") which are connected to the circumferential oil paths 47a and 47f, respectively and radially extend.

The axial oil path 46 is classified into first axial oil paths 46a to 46e, 46k to 46o, and 46u to 46y in which the lubricant oil flows in one direction (from the left to right in FIG. 1), and second axial oil paths 46f to 46j, and 46p to 46t in which the lubricant oil flows in the other direction (from the right to left in FIG. 1). That is, the circulation oil path 45 axially reciprocates in the casing 22.

The circumferential oil path 47 connects the axial oil paths 46 to each other, and the axial oil path 46 to the radial oil path 48. More specifically, the circumferential oil path 47a distributes the lubricant oil discharged from the radial oil path 48a to the axial oil paths 46a to 46e. Similarly, the circumferential oil path 47b distributes the lubricant oil discharged from the axial oil paths 46a to 46e to the axial oil paths 46f to 46j, the circumferential oil path 47c distributes the lubricant oil discharged from the axial oil paths 46f to 46j to the axial oil paths 46k to 46o, the circumferential oil path 47d distributes the lubricant oil discharged from the axial oil paths 46k to 46o to the axial oil paths 46p to 46t, and the circumferential oil path 47e distributes the lubricant oil discharged from the axial oil paths 46p to 46t to the axial oil paths 46u to 46y. Furthermore, the circumferential oil path 47f supplies the lubricant oil discharged from the axial oil paths 46u to 46y to the radial oil path 48b.

The radial oil path 48a supplies the lubricant oil pumped from the rotation pump 51 to the circumferential oil path 47a, and the radial oil path 48b supplies the lubricant oil discharged from the circumferential oil path 47f to the lubricant oil path 25c.

Here, the rotation pump 51 is provided between the lubricant oil discharge port 22b and the circulation oil path 45, to forcibly circulate the lubricant oil. Referring to FIG. 7, the rotation pump 51 is a cycloidal pump including an inner rotor 52 rotating by use of a rotation of the wheel side rotation member 28, and an outer rotor 53 dependently rotating in accordance with a rotation of the inner rotor 52, a pump chamber 54, an inlet 55 communicating with the lubricant oil discharge port 22b, and an outlet 56 communicating with the circulation oil path 22c.

The inner rotor 52 has teeth composed of a cycloidal curve along its outer diameter surface. More specifically, a shape of a tooth tip 52a is an epicycloidal curve, and a shape of a tooth groove 52b is a hypocycloidal curve. The inner rotor 52 fits to an outer diameter surface of the cylindrical part 31d of the stabilizer 31b and integrally rotates with the inner pin 31 (wheel side rotation member 28).

The outer rotor 53 has teeth composed of a cycloidal curve along its inner diameter surface. More specifically, a shape of a tooth tip 53a is a hypocycloidal curve, and a shape of a tooth groove 53b is an epicycloidal curve. The outer rotor 53 is rotatably supported by the casing 22.

The inner rotor 52 rotates around a rotation center c1. Meanwhile, the outer rotor 53 rotates around a rotation center c2 away from the rotation center c1 of the inner rotor. In addition, when it is assumed that the number of teeth of the inner rotor 52 is n, the number of teeth of the outer rotor 53 is (n+1). In addition, in this embodiment, n=5.

The plurality of pump chambers 54 are provided in a space between the inner rotor 52 and the outer rotor 53. Thus, when the inner rotor 52 rotates by use of the rotation of the wheel side rotation member 28, the outer rotor 53 dependently rotates in accordance with it. At this time, since the inner rotor 52 and the outer rotor 53 rotate around the different rotation centers c1 and c2, respectively, the pump chamber sequentially changes in volume. As a result, the lubricant oil inputted from the inlet 55 is pumped out from the outlet 56 to the radial oil path 48a.

In addition, when the inner rotor 52 inclines during a rotation of the rotation pump 51 having the above configuration, the lubricant oil could not be pumped appropriately by the change of the pump chamber 54 in volume, or the inner rotor 52 and the outer rotor 53 could be damaged due to contact between them. Thus, referring to FIG. 1, the inner rotor 52 is provided with a stepped part 52c. This stepped part 52c prevents the inner rotor 52 from inclining due to a radial load from the wheel 14 by abutting its outer diameter surface (guide surface) on an inner diameter surface of the casing 22.

Furthermore, the lubricant oil storage part 22d is provided between the lubricant oil discharge port 22b and the rotation pump 51 to temporarily store the lubricant oil. Thus, at the time of high-speed rotation, the lubricant oil that the rotation pump 51 is unable to discharge can be temporarily stored in the lubricant oil storage part 22d. As a result, a torque loss of the reducer part B can be prevented from increasing. Meanwhile, at the time of low-speed rotation, even when the lubricant oil amount which reaches the lubricant oil discharge part 22b becomes small, the lubricant oil stored in the lubricant oil storage part 22d can be returned to the lubricant oil path 25c. As a result, the lubricant oil can be stably supplied to the reducer part B.

In addition, the lubricant oil in the reducer part B is moved outward due the gravity in addition to the centrifugal force. Therefore, it is desirable to mount the lubricant oil storage part 22d on the electric car 11 so that it is positioned in a lower part of the in-wheel motor drive device 21.

Furthermore, the reducer part lubricating mechanism further has a cooling means for cooling the lubricant oil passing through the circulation oil path 45. The cooling means in this embodiment includes a cooling water path 22e provided in the casing 22, and an air vent plug 22f to discharge the air in the cooling water path 22e. In addition, the cooling means contributes to not only cooling the lubricant oil but also cooling the motor part A.

The cooling water path 22e is provided in a position so as to be in contact with the axial oil path 46 in the casing 22. Thus, a partition member 49 is provided between the axial oil path 46 and the cooling water path 22e to separate them. The partition member 49 is a cylindrical member, and formed of a material having higher thermal conductivity than a material of the casing 22. More specifically, the material includes brass, copper, and aluminum etc. The air vent plug 22f discharges the air contained in the cooling water path 22e to the outside. Thus, there is no air in the cooling water path 22e, so that cooling efficiency is improved.

A description will be made of a flow of the lubricant oil in the reducer part B having the above configuration. First, the lubricant oil flowing in the lubricant oil path 25c flows out from an opening part 42c penetrating the lubricant oil supply port 25d and the inner ring member 42 to the reducer part B by the centrifugal force generated by the rotation of the motor side rotation member 25.

Since the centrifugal force further acts on the lubricant oil in the reducer part B, the lubricant oil is moved to the radial outer side while lubricating the inner side track surface 42a, the outer side track surface 43, an abutment part between the curved plates 26a and 26b, and the inner pin 31, and an abutment part between the curved plates 26a and 26b, and the outer pin 27.

Thus, the lubricant oil reaches the inner wall surface of the casing 22 and is discharged from the lubricant oil discharge port 22b and stored in the lubricant oil storage part 22d. The lubricant oil stored in the lubricant oil storage part 22d is supplied from the inlet 55 to the rotation pump 51 through the flow path in the casing 22, and pumped out from the outlet 56 to the circulation oil path 45.

The lubricant oil discharged from the outlet 56 is distributed from the circumferential oil path 47a to the axial oil paths 46a to 46e through the radial oil path 48a. Then, the lubricant oil passes through the axial oil paths 46a to 46e (from the left to right in FIG. 1) and is distributed from the circumferential oil path 47b to the axial oil paths 46f to 46j. Similarly, it passes through the axial oil paths 46f to 46j (from the right to left in FIG. 1), the circumferential oil path 47c, the axial oil paths 46k to 46o (from the left to right in FIG. 1), the circumferential oil path 47d, the axial oil paths 46p to 46t (from the right to left in FIG. 1), the circumferential oil path 47e, the axial oil paths 46u to 46y (from the left to right in FIG. 1), the circumferential oil path 47f, and the radial oil path 48b and is returned to the lubricant oil path 25c.

Here, a discharge amount of the lubricant oil from the lubricant oil discharge port 22b increases in proportion to rotation speed of the motor side rotation member 25. Meanwhile, since the inner rotor 52 integrally rotates with the wheel side rotation member 28, a discharge amount from the rotation pump 51 increases in proportion to rotation speed of the wheel side rotation member 28. In addition, a lubricant oil amount supplied from the lubricant oil discharge port 22b to the reducer part B increases in proportion to the discharge amount of the rotation pump 51. That is, the supply amount and discharge amount of the lubricant oil to the reducer part B both change depending on the rotation speed of the in-wheel motor drive device 21, so that the lubricant oil can be smoothly circulated.

Furthermore, a part of the lubricant oil flowing in the circulation oil path 45 lubricates the rolling bearing 36a from a space between the casing 22 and the motor side rotation member 25, and also functions as a cooling liquid to cool the motor part A. In addition, the rolling bearing 36b is lubricated with the lubricant oil from a space between the stepped part 52c of the rotation pump 51 and the casing 22.

Thus, a shortage of the lubricant oil amount in the vicinity of the motor side rotation member 25 can be avoided by supplying the lubricant oil from the motor side rotation member 25 to the reducer part B. In addition, by forcibly discharging the lubricant oil by the rotation pump 51, agitation resistance is suppressed and the torque loss of the reducer part B can be reduced. Furthermore; since the rotation pump 51 is arranged in the casing 22, the in-wheel motor drive device 21 can be prevented from becoming large as a whole.

In addition, since the circulation oil path 45 axially reciprocates in the casing 22 (2.5 reciprocations in this embodiment), it has more opportunities to be in contact with the cooling water path 22e. As a result, after the lubricant oil has been sufficiently cooled down, it is returned to the radial oil path 48b. In addition, the number of reciprocations (2.5 reciprocations) of the circulation oil path 45 and the number (25) of the axial oil paths 46 may be arbitrarily set. In addition, any kind of cooling liquid other than water can flow in the cooling water path 22e.

The wheel hub bearing part C includes the wheel hub 32 fixedly connected to the wheel side rotation member 28, and a wheel hub bearing 33 rotatably holding the wheel hub 32 with respect to the casing 22. The wheel hub 32 has a cylindrical hollow part 32a and a flange part 32b. The driving wheel 14 is fixedly connected to the flange part 32b by a bolt 32c. In addition, a spline and a male screw are formed around an outer diameter surface of the shaft part 28b of the wheel side rotation member 28. In addition, a spline hole is formed in an inner diameter surface of the hollow part 32a of the wheel hub 32. Thus, the wheel side rotation member 28 is screwed with the inner diameter surface of the wheel hub 32 and its tip end is fixed by a nut 32d, whereby both are fastened.

The wheel hub bearing 33 is a double-row angular ball bearing including an inner ring 33a fitted and fixed to an outer diameter surface of the wheel hub 32, an outer ring 33b fitted and fixed to the inner diameter surface of the casing 22, a plurality of balls 33c as a rolling body arranged between the inner rig 33a and the outer ring 33b, a retainer 33d retaining an interval of the adjacent balls 33c, and a sealing member 33e sealing axial each end of the wheel hub bearing 33.

A detailed description will be made of an operation principle of the above in-wheel motor drive device 21.

When the motor part A receives an electromagnetic power generated by supplying an AC current to a coil of the stator 23, the rotor 24 composed of a permanent magnet or a magnetic body starts rotating. Thus, the motor side rotation member 25 connected to the rotor 24 rotates, and the curved plates 26a and 26b execute the revolution motion around the rotation axis of the motor side rotation member 25. At this time, the outer pins 27 engage with the curved waveforms of the curved plates 26a and 26b, to allow the curved plates 26a and 26b to execute the rotation motion in a direction opposite to the rotation of the motor side rotation member 25.

The inner pin 31 passing through the through hole 30a abuts on an inner wall surface of the through hole 30a in accordance with the rotation motion of the curved plates 26a and 26b. Thus, the revolution motion of the curved plates 26a and 26b is not transmitted to the inner pin 31, and only the rotation motion of the curved plates 26a and 26b is transmitted to the wheel hub bearing part C through the wheel side rotation member 28.

At this time, since the rotation speed of the motor side rotation member 25 is reduced and transmitted to the wheel side rotation member 28, the torque required for the driving wheel 14 can be transmitted even when the low torque and high rotation type motor part A is employed.

In addition, a reduction ratio of the above reducer part B is calculated by a formula $(Z_A - Z_B)/Z_B$ wherein $Z_A$ represents the number of the outer pins 27, and $Z_B$ represents the number of the waveforms of the respective curved plates 26a and 26b. Since $Z_A = 12$ and $Z_B = 11$ in the embodiment shown in FIG. 2, the reduction ratio is 1/11, so that the considerably high ratio can be obtained.

Thus, by employing the reducer part B capable of implementing the high reduction ratio without providing a multi-stage configuration, the in-wheel motor drive device 21 can be compact in size and implement the high reduction ratio. In addition, since the needle roller bearings 27a and 31a are provided for the outer pin 27 and the inner pin 31, respectively, the frictional resistance with the curved plates 26a and 26b can be reduced, so that transmission efficiency is improved in the reducer part B.

The unsprung weight can be suppressed by employing the in-wheel motor drive device 21 according to the above embodiment in the electric car 11. As a result, the electric car 11 can be superior in running stability.

In addition, while the lubricant oil supply port 25d is provided in the respective eccentric parts 25a and 25b in the above embodiment, the present invention is not limited to this, and it can be provided in any position in the motor side rotation member 25. However, it is desirable to provide the lubricant oil supply port 25d in the respective eccentric parts 25a and 25b with a view to stably supplying the lubricant oil to the rolling bearing 41.

In addition, while the rotation pump 51 is driven by use of the rotation of the wheel side rotation member 28 in the above embodiment, the rotation pump 51 can be driven by use of the rotation of the motor side rotation member 25. However, since the rotation speed of the motor side rotation member 25 is high (11 times in the above embodiment) as compared with that of the wheel side rotation member 28, durability could be lowered. In addition, a sufficient discharge amount can be ensured even when it is connected to the wheel side rotation member 28. In view of the above points, it is preferable to drive the rotation pump 51 by use of the rotation of the wheel side rotation member 28.

Furthermore, while the cycloidal pump is used as the rotation pump 51 in the above embodiment, the present invention is not limited to this, and any kind of rotation type pump may be employed as long as it can be driven by use of the rotation of the wheel side rotation member 28. Furthermore, the rotation pump 51 may be omitted and the lubricant oil may be circulated only by the centrifugal force.

In addition, while the two curved plates 26a and 26b in the reducer part B are provided with their phases shifted by 180° in the above embodiment, the number of the curved plates may be arbitrarily set, and when the three curved plates are provided, their phases are shifted by 120°, for example.

In addition, the motion converting mechanism is composed of the inner pins 31 fixed to the wheel side rotation member 28, and the through holes 30a provided in the curved plates 26a and 26b, in the above embodiment, the present invention is not limited to this, and any configuration may be employed as long as the rotation of the reducer part B can be transmitted to the wheel hub 32. For example, the motion converting mechanism may be composed of inner pins fixed to the curved plate, and holes formed in the wheel side rotation member.

In addition, while the description of the operation has been made, focusing on the rotation of each member in the above embodiment, motive force including the torque is transmitted from the motor part A to the driving wheel in practice. Therefore, the motive force reduced in speed as described above has been converted to a high torque.

In addition, in the description of the operation in the above embodiment, the power is supplied to the motor part A to drive the motor part A, and the motive force from the motor part A is transmitted to the driving wheel 14, but the above may be reversed such that when the vehicle is reduced in speed or goes downhill, motive force from the driving wheel 14 is converted to a rotation having high speed and low torque in the reducer part B, and transmitted to the motor part A and a power is generated in the motor part A. In this case, the generated power may be charged in a battery to be used to drive the motor part A or another electric equipment provided in the vehicle later.

In addition, a brake may be added to the configuration in the above embodiment. For example, a parking brake may be provided in the above configuration in FIG. 1 such that the casing 22 is axially elongated to form a space on the right side of the rotor 24 in the drawing, and a rotation member integrally rotating with the rotor 24, a piston incapable of rotating with respect to the casing 22 but capable of axially moving, and a cylinder to operate the piston are arranged therein to rock the rotor 24 by fitting the piston to the rotation member when the vehicle stops.

Alternatively, a disc brake may be provided such that a flange formed in a part of a rotation member integrally rotating with the rotor 24 and a friction plate set on the side of the casing 22 are sandwiched by a cylinder set on the side of the casing 22. Furthermore, a drum brake may be provided such that a drum is formed in a part of the rotation member, and a brake shoe is fixed to the casing 22, and the rotation member is rocked by frictional engagement and a self-engaging action.

In addition, the cylindrical roller bearing is shown as the bearing to support the curved plates 26a and 26b in the above embodiment, the present invention is not limited to this, and various kinds of bearings can be used such as a sliding bearing, cylindrical roller bearing, tapered roller bearing, needle roller bearing, self-aligning roller bearing, deep groove ball bearing, angular ball bearing, or four point contact ball bearing, regardless of whether the sliding bearing or the rolling bearing, regardless of whether a rolling body is the roller or ball, and regardless of whether a double row or single row. In addition, as for the bearing arranged in the other parts also, any type of bearing may be used for it similarly.

However, the deep groove ball bearing is high in allowable limit rotation speed but low in load capacity as compared with the cylindrical roller bearing. Therefore, in order to obtain a required load capacity, it is necessary to employ a large-type deep groove ball bearing. Thus, the cylindrical roller bearing is preferably used as the rolling bearing 41 with a view to reducing the in-wheel motor drive device 21 in size.

Furthermore, while the radial gap motor is employed for the motor part A in the above embodiment, the present invention is not limited to this, and any kind of motor can be applied. For example, it may be an axial gap motor including a stator fixed to a casing, and a rotor arranged on the inner side of the stator so as to be opposed thereto with an axial space in between.

In addition, while the in-wheel motor drive device 21 employs the cycloidal reducing mechanism for the reducer part B in the above embodiment, the present invention is not limited to this, and any kind of reducing mechanism can be employed. For example, an epicyclic gear reducing mechanism or a parallel shaft gear reducing mechanism may be employed.

Furthermore, while the rear wheel 14 is the driving wheel in the electric car 11 shown in FIG. 8, the present invention is not limited to this, and the front wheel may be the driving wheel, or the car may be a four-wheel-drive vehicle. In addition, the "electric car" in this specification includes all kinds of cars which obtains driving force from an electric power, so that it should include a hybrid car and the like.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

Industrial Applicability

The in-wheel motor drive device according to the present invention is advantageously applied to an electric car and a hybrid vehicle.

The invention claimed is:
1. An in-wheel motor drive device comprising:
   a motor part to rotatably drive a motor side rotation member;
   a reducer part to reduce rotation speed of said motor side rotation member and transmit it to a wheel side rotation member;
   a casing to hold said motor part and said reducer part;
   a wheel hub fixedly connected to said wheel side rotation member; and
   a reducer part lubricating mechanism to supply a lubricant oil to said reducer part, wherein
   said reducer part lubricating mechanism includes:
   a lubricant oil path provided in said motor side rotation member;
   a lubricant oil supply port extending from said lubricant oil path toward an outer diameter surface of said motor side rotation member;
   a lubricant oil discharge port provided in said casing to discharge the lubricant oil from said reducer part;
   a circulation oil path passing through said casing to connect said lubricant oil discharge port to said lubricant oil path, and to return the lubricant oil discharged from said lubricant oil discharge port to said lubricant oil path;
   a cooling water path provided in said casing so as be in contact with said circulation oil path to cool down the lubricant oil passing through the circulation oil path; and
   a partition member arranged in a contact position between said circulation oil path and said cooling water path, to separate them.

2. The in-wheel motor drive device according to claim 1, wherein
   said partition member is formed of a material having thermal conductivity higher than that of said casing.

3. The in-wheel motor drive device according to claim 1, wherein
   said circulation oil path axially reciprocates in said casing.

4. The in-wheel motor drive device according to claim 1, wherein
   said reducer part lubricating mechanism further comprises a rotation pump arranged in said casing to circulate the lubricant oil by use of a rotation of said wheel side rotation member.

5. The in-wheel motor drive device according to claim 4, wherein
   said rotation pump is a cycloidal pump comprising:
   an inner rotor having teeth composed of a cycloidal curve along its outer diameter surface and integrally rotating with said wheel side rotation member, and an outer rotor having teeth composed of a cycloidal curve along its inner diameter surface, rotatably supported by said casing, and rotating around a point away from a rotation center of said inner rotor.

6. The in-wheel motor drive device according to claim 1, wherein said motor side rotation member has an eccentric part, and said reducer part includes:

a revolution member having a through hole passing through said eccentric part, and executing revolution motion around a rotation axis of said motor side rotation member in accordance with a rotation thereof;

a periphery engagement member fixed to said casing, and engaging with a periphery part of said revolution member to generate rotation motion of said revolution member; and a motion converting mechanism having an inner pin provided in said wheel side rotation member and a hole having a diameter larger than an outer diameter of said inner pin by a predetermined amount to receive said inner pin, to convert the rotation motion of said revolution member to rotation motion around a rotation axis of said motor side rotation member and transmit it to said wheel side rotation member.

* * * * *